United States Patent [19]

Chu et al.

[11] 4,371,949
[45] Feb. 1, 1983

[54] TIME-SHARED, MULTI-PHASE MEMORY ACCESSING SYSTEM HAVING AUTOMATICALLY UPDATABLE ERROR LOGGING MEANS

[75] Inventors: Ke-Chiang Chu, San Jose; Richard S. Sharp, Santa Barbara, both of Calif.

[73] Assignee: Burroughs Corporation, Detroit, Mich.

[21] Appl. No.: 162,218

[22] Filed: Jun. 23, 1980

Related U.S. Application Data

[60] Continuation of Ser. No. 929,048, Jul. 28, 1978, abandoned, which is a division of Ser. No. 801,868, May 31, 1977, Pat. No. 4,174,537.

[51] Int. Cl.³ ............... G06F 11/08; G11C 29/00; H03K 13/32
[52] U.S. Cl. ............... 364/900; 371/38
[58] Field of Search ............... 371/13, 37, 38, 49, 371/51; 364/200 MS File, 900 MS File

[56] References Cited

U.S. PATENT DOCUMENTS

| | | | |
|---|---|---|---|
| 3,209,327 | 9/1965 | Brandt | 371/51 |
| 3,735,105 | 5/1973 | Maley | 371/38 |
| 4,023,146 | 5/1977 | Carroll | 364/900 |
| 4,072,924 | 2/1978 | Pomerantz | 340/519 |
| 4,100,605 | 7/1978 | Holman | 364/900 |
| 4,107,652 | 8/1978 | Tanahashi et al. | 371/37 |

*Primary Examiner*—Harvey E. Springborn
*Attorney, Agent, or Firm*—Nathan Cass; Kevin R. Peterson; David G. Rasmussen

[57] ABSTRACT

Automatically updatable error logging means incorporated in a multi-phase, bit addressable, variable field memory system. The memory system is partitioned into a plurality of individually addressable memory stacks and employs time-shared accessing of the memory stacks along with time-shared error detection and correction which is used with the error logging means to provide for automatic logging of detected errors during memory accesses on a priority basis.

10 Claims, 14 Drawing Figures

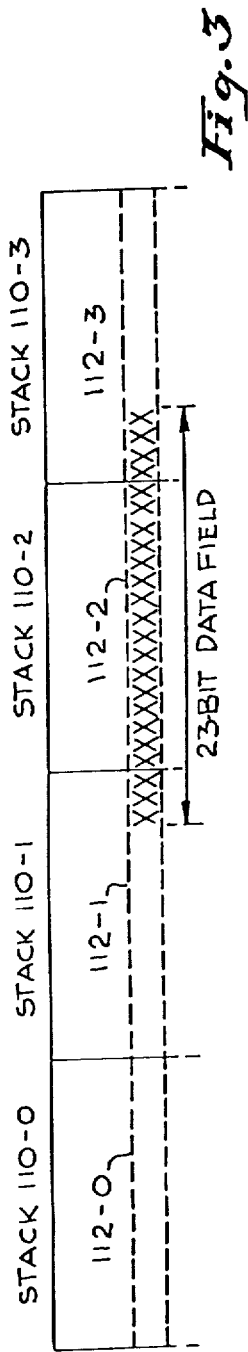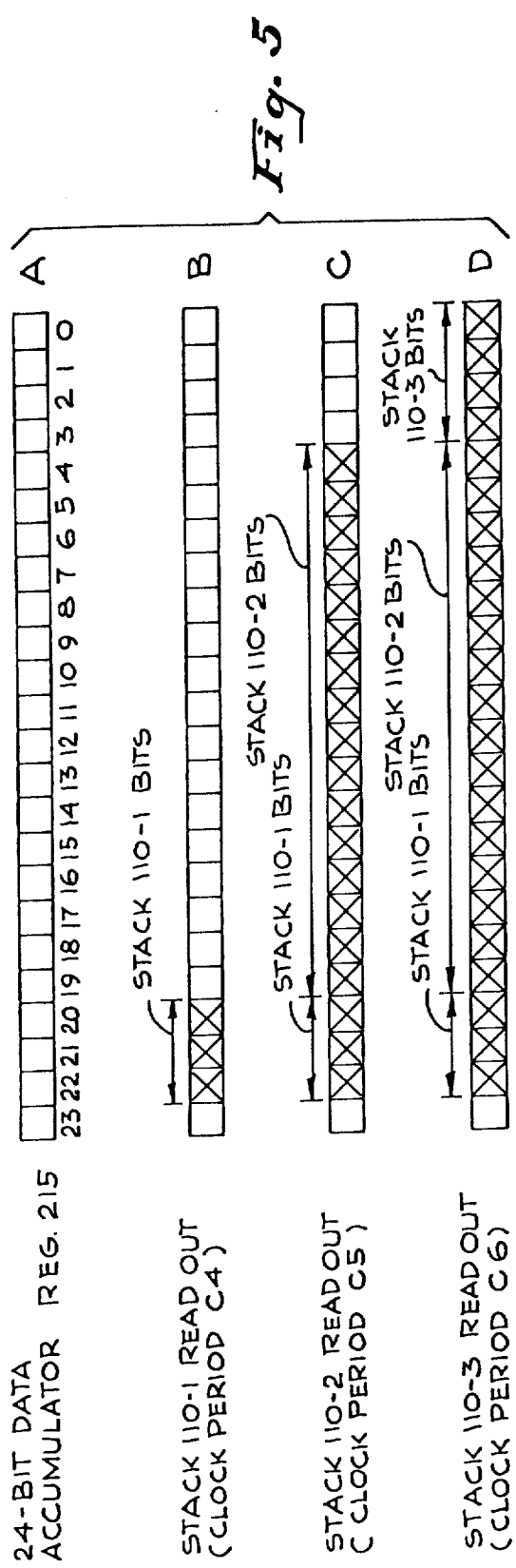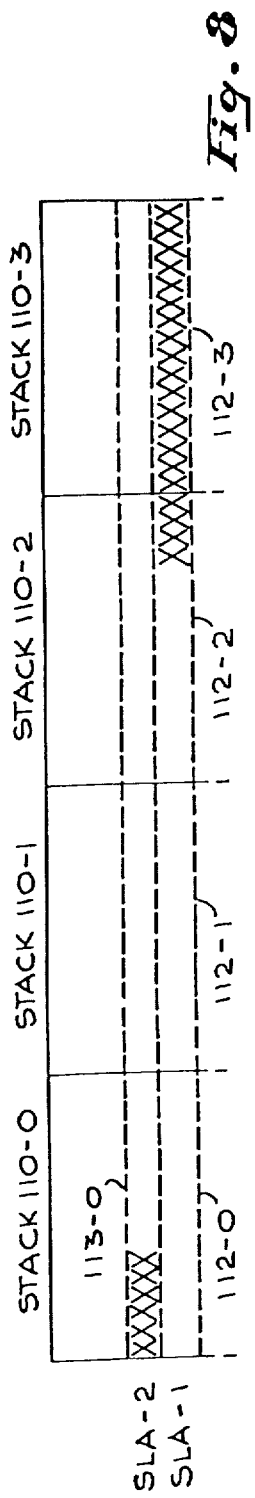

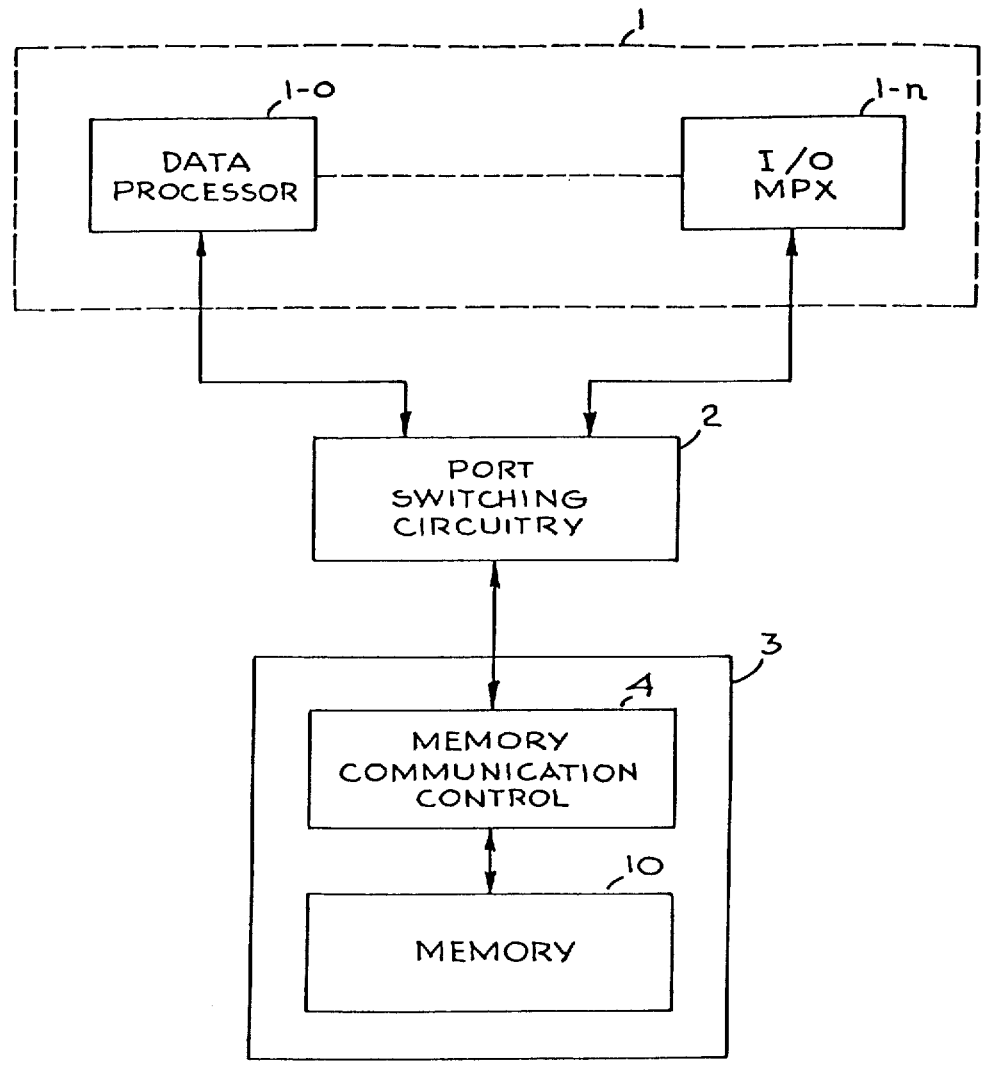
Fig. A
PRIOR ART

TIME-SHARED, MULTI-PHASE MEMORY ACCESSING SYSTEM HAVING AUTOMATICALLY UPDATABLE ERROR LOGGING MEANS

This is a continuation, of application Ser. No. 929,048, filed July 28, 1978, now abandoned which is in turn a division of Ser. No. 801,868, filed May 31, 1977, now U.S. Pat. No. 4,174,537.

CROSS-REFERENCE TO RELATED APPLICATIONS AND PATENTS

The commonly assigned U.S. Pat. No. 3,781,812 entitled Addressing System Responsive to a Transfer Vector for Accessing a Memory by C. E. Wymore et al. discloses a memory addressing system in which the present invention may be incorporated.

The disclosures of the above referenced patent and applications are to be considered as incorporated herein.

BACKGROUND OF THE PRESENT INVENTION

The present invention is directed to improved means and methods for handling errors detected when transferring data in a data processing system, and more particularly when employed in connection with the reading and writing of data in a random access memory of the type disclosed in the cross-referenced applications.

Random access memories are well known in the computer art. Such memories can be constructed from many different types of bit storing devices, such as magnetic and semiconductor elements and the like. By random access is meant that the elements are grouped together into locations and that data items can be written into or read from any group of elements or cells forming one location in approximately the same time as from any other location.

In early computer systems the data to be processed was usually grouped into words having a field length equal to the number of elements or cells per location in the system memory. As the range of problems presented to data processing systems expanded, the types of formats used to represent data items have multiplied. Thus, the memory has been required to store fields of data which may have variable field lengths shorter than or longer than the number of cells in a location. Also, in order to use the available storage capacity of the memory efficiently, it has become necessary to be able to specify not only a specific location in the memory, but also to specify particular cells within a selected memory location.

In the cross-referenced U.S. Pat. No. 3,781,812, an advantageous memory addressing system is disclosed which provides variable field length and bit addressing capabilities, and also permits memory cells to be accessed on either side of a designated boundary. A bit addressable, variable field memory system of the type disclosed in this patent is currently employed in Burroughs B 1700 computer systems.

In the preferred embodiment disclosed in the cross-referenced U.S. Pat. No. 3,781,812, the memory is partitioned into a plurality of independently operating modules. Fields of data bits can be stored in one or more modules, that is, partly in one module and partly in other modules. Each module is coupled to its own access control circuitry and, during a particular access operation, data is simultaneously transferred in parallel to or from one or more modules as determined by field length and direction indicating portions of the applied addressing information. Rotation and masking circuitry responsive to starting bit and field length information serve to rotate and mask the transferred data so that it is compatible with the memory and processor formats being employed and so that unwanted data outside of the desired field is inhibited.

SUMMARY OF THE PRESENT INVENTION

In a preferred embodiment incorporating the present invention, a time-shared, multi-phase memory accessing system is provided which permits the memory modules to time-share addressing and output circuitry as well as error checking, correcting and check code generating circuitry, while also permitting a significant reduction to be made in the bit width requirements of these circuits. In addition, error logging means are provided which operate during each stack access to automatically log a detected error on a predetermined priority basis.

The specific nature of the invention as well as other objects, advantages and uses thereof will become evident from the following description of a preferred embodiment taken in conjunction with the accompanying drawings.

BRIEF DESCRIPTION OF THE DRAWINGS

FIG. A is an overall block diagram of a data processing system in which the present invention may be incorporated.

FIG. 3 is a schematic representation illustrating a typical example of how a data field may be stored in the memory 10 of FIG. 2.

FIG. 5 is a series of diagrams illustrating the operation of the embodiment of FIG. 2 during performance of the read cycle of FIG. 4.

FIG. 8 is a schematic representation illustrating a typical example of how a data field may be stored in the memory 110 of FIG. 2 in a manner so as to extend over a plurality of different memory location addresses and thereby require address modification during the performance of a read or write cycle.

DETAILED DESCRIPTION

Figure 1:
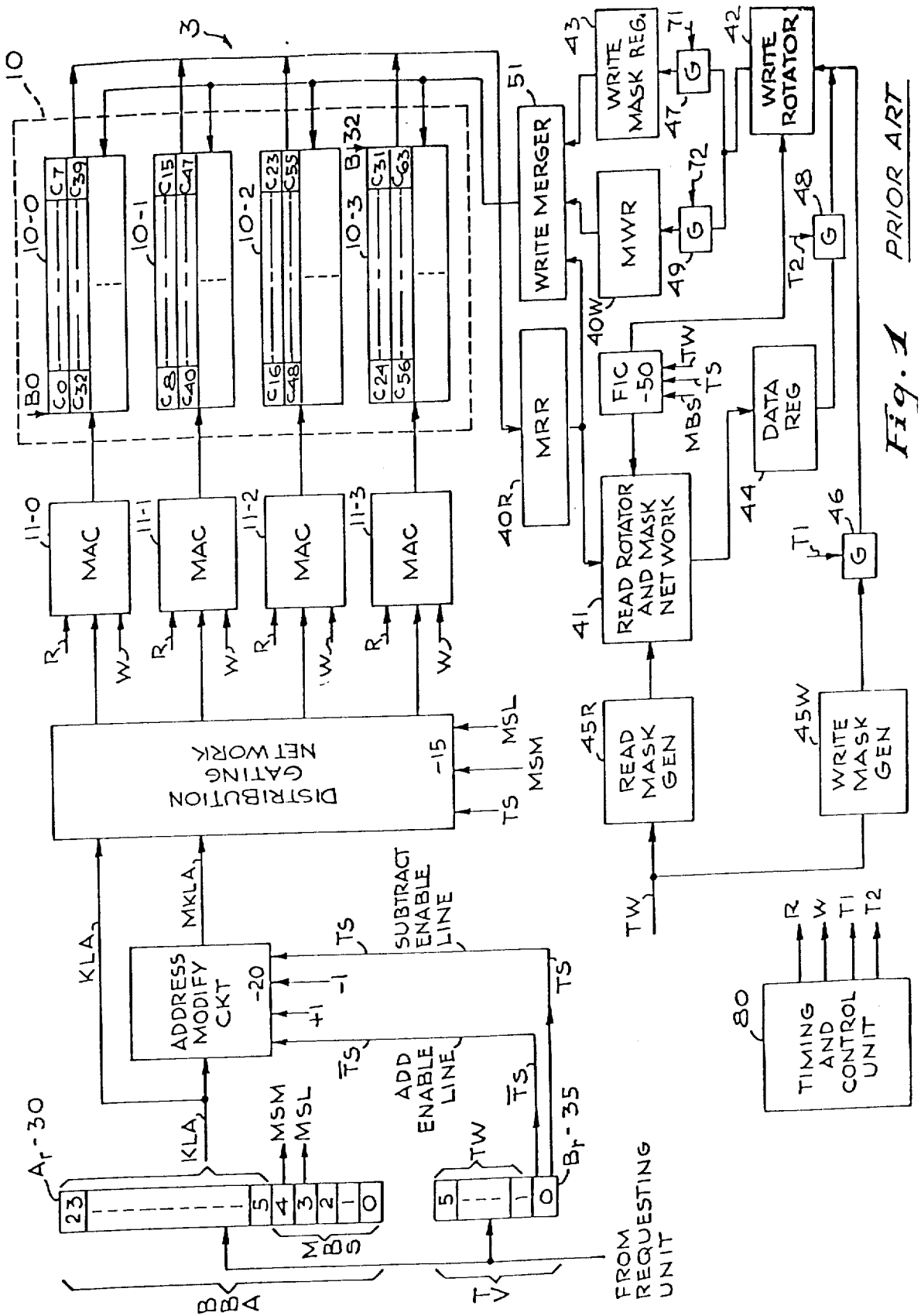
FIG. 1 is a block diagram of a preferred embodiment of the memory and addressing system disclosed in cross-referenced U.S. Pat. No. 3,781,812.

Introduction:

Like numerals refer to like elements throughout the drawings.

Initially, it is to be noted that the present invention will be illustrated by describing how the present invention may be embodied in a bit addressable variable field memory and addressing system of the type disclosed in the cross-referenced U.S. Pat. No. 3,781,812. However, it is to be understood that this is being done merely for illustrative purposes, and that the features of the invention are also applicable to a wide variety of other types of systems. Accordingly, the particular embodiments described herein should not be considered as limiting the scope of the present invention.

DESCRIPTION OF PREFERRED EMBODIMENT OF U.S. Pat. No. 3,781,812 (FIGS. A AND 1)

Referring first to FIG. A, illustrated therein is a block diagram of the major components of a prior art data processing system in which the present invention may be incorporated. A like FIG. A is included in the cross-referenced U.S. Pat. No. 3,781,812. A memory and memory addressing system 3 includes a main memory 10 which stores information for a plurality of requesting units 1 such as, for example, a data processor 1-0 and an input/output multiplexor 1-n. Data processor 1-0 may be of the type described in U.S. Pat. No. 3,739,352 cross-referenced above. The requesting devices 1 are coupled to the main memory 10 through port switching circuitry 2 and memory communications control 4. Port switching exchange 2 comprises conventional circuitry for providing a communications path between any selected one of the requesting units 1 and memory 10.

Each of the requesting units 1 provides address information to port switching circuitry 2 which gates the address information to memory and memory addressing system 3. The requesting units also provide information to be written into memory 10 during write requests and accept information read out of memory 10 during read requests.

Referring next to FIG. 1, illustrated therein is a block diagram of the preferred embodiment of the bit-addressable, variable field memory and memory addressing system disclosed in the cross-referenced U.S. Pat. No. 3,781,812, a like FIG. 1 also appearing therein. As shown, memory 10 is partitioned into four modules 10-0 through 10-3. Each module is a conventional random access memory and can be constructed from many different types of memory elements, such as magnetic cores, thin films, semiconductors or the like. FIG. 1 shows that each module is partitioned into addressable locations, each location, for example, having eight cells in a row, such as cells $C_0$-$C_7$ in module 10-0. Information is read from or written into a module one location (i.e., a row of eight cells in parallel) at a time. In this regard it should be recognized that, as is well known, the cells in an addressable memory need not be and generally are not spacially arranged contiguously in rows. By the same token, the spacial relationship between locations is of no particular significance. Accordingly, references made herein to memory cell locations are directed to the addressability of the locations.

Each module in FIG. 1 is coupled to its own memory access control circuit (MAC). The MACs are referenced in FIG. 1 as 11-0 through 11-3. Each MAC is responsive to an absolute address signal to select a location in the module to which it is coupled and cause data bits to be transferred between the cells in the selected location and a memory read register 40R. The particular one or more MACs involved in a data transfer is determined by field length and direction information included in the applied address information, the data transferred to or from the selected modules being simultaneously transferred in parallel between the selected modules and the read and write information registers 40R and 40W. The read and write registers 40R and 40W may each typically have 32 flip-flops to accommodate data with respect to four memory locations, one location of eight bits for each module. The transfer of data can be in either direction. That is, each MAC responds to a read control signal on its R input to read data from the selected location for transfer to the read register 40R, and each MAC responds to a write control signal to transfer data in the write register 40W for writing into the selected location. The source of the read and write control signals is a conventional control and timing unit shown as block 80.

Although not limited thereto, in the preferred embodiment of the cross-referenced U.S. Pat. No. 3,781,812, the read operation is non-destructive. Briefly, the read operation proceeds as follows: one of the requesting units 1 of FIG. A provides address information and the memory modules of memory 10 are accessed by MAC11-0 through MAC11-3 and up to 32 data bits are read out and loaded into the 32 flip-flops of the read register 40R. Data stored in the read register 40R is next transferred to a data register 44 through a read rotator and masking network 41. Finally, the data stored in data register 44 is coupled by means not shown back to the requesting unit 1. Read rotator and masking network 41 serves to isolate a desired field from the 32 bits stored in the read register 40R and also to rotate the desired field into a desired position in the data register 44. A field isolation control unit FIC50 controls the number of digit places by which the data is rotated, and a read mask generator 45R controls the masking function. Data register 44 may typically comprise 24 flip-flops.

The write operation in the preferred embodiment of the cross-referenced U.S. Pat. No. 3,781,812 involves a non-destructive read phase, a modifying phase, and a restore phase. The purpose of this read/modify/restore cycle is to enable the writing of bits of data into some of the cells in a selected location without changing the contents of other cells in the selected locations. Briefly, the write operation proceeds as follows: new data which is to be written into memory 10 is stored in the data register 44. The source which supplies this data is not shown in FIG. 1; it could be any data source within one of the requesting units 1 (FIG. A) of the data processing system. Old data which is in memory 10 is read out and transferred into the read register 40R. The new data is transferred into the write register 40W via gates 48 and 49 and a write rotator 42 which rotates the new data as determined by FIC50. Write merger 51 merges the outputs of the read and write registers 40R and 40W under the control of write mask register 43, whose masking is in turn determined by a write mask generator 45W. The output of the write merger register 51 is next written into the respective memory modules of memory 10 as determined by the applied addressing information.

Each MAC in FIG. 1 is coupled to an address distribution gating network 15 to receive therefrom absolute addressing signals which in turn are derived from input addressing information contained in A register 30 and B register 35, which taken collectively constitute an address code. As indicated in FIG. 1, the address code comprises a bit boundary address field BBA which specifies a boundary between any arbitrary two cells in the memory, a transfer sign field TS which specifies one of either side of the specified boundary, and a transfer width field TW which specifies any one of a variable number of cells up to 24 which are to be involved in a data transfer. An MBS portion of BBA determines the starting cell location for the transferred data, and MSM and MSL determine the particular module which contains the starting cell location. An address modifying circuit 20 in FIG. 1 typically comprises a conventional binary add/subtract circuit which operates in response to the transfer sign field TS to appropriately modify the address applied to the gating network 15 so as to permit addressing of module cells in either a positive or negative direction with respect to the starting cell location.

As shown in FIG. 1 the transfer width field TW is applied in parallel to both the read and write mask generators 45R and 45W for generating the appropriate mask required for each data transfer. The transfer field TW is also applied to the field isolation control unit FIC50 along with the transfer sign field TS and the MBS portion of the bit boundary address field BBA so that FIC50 can provide appropriate signals to the read and write rotators 41 and 42 for rotating the transferred data by the amount required for desired justification desired.

More specific details with regard to the construction and operation of the preferred embodiment disclosed in the cross-referenced U.S. Pat. No. 3,781,812 can be obtained by reference thereto, this patent also including examples of preferred detailed embodiments of gating network 15, rotators 41 and 42, field isolation control 50 and write merger 51 shown generally in FIG. 1.

DETAILED DESCRIPTION (FIGS. 2-8)

Figure 2:
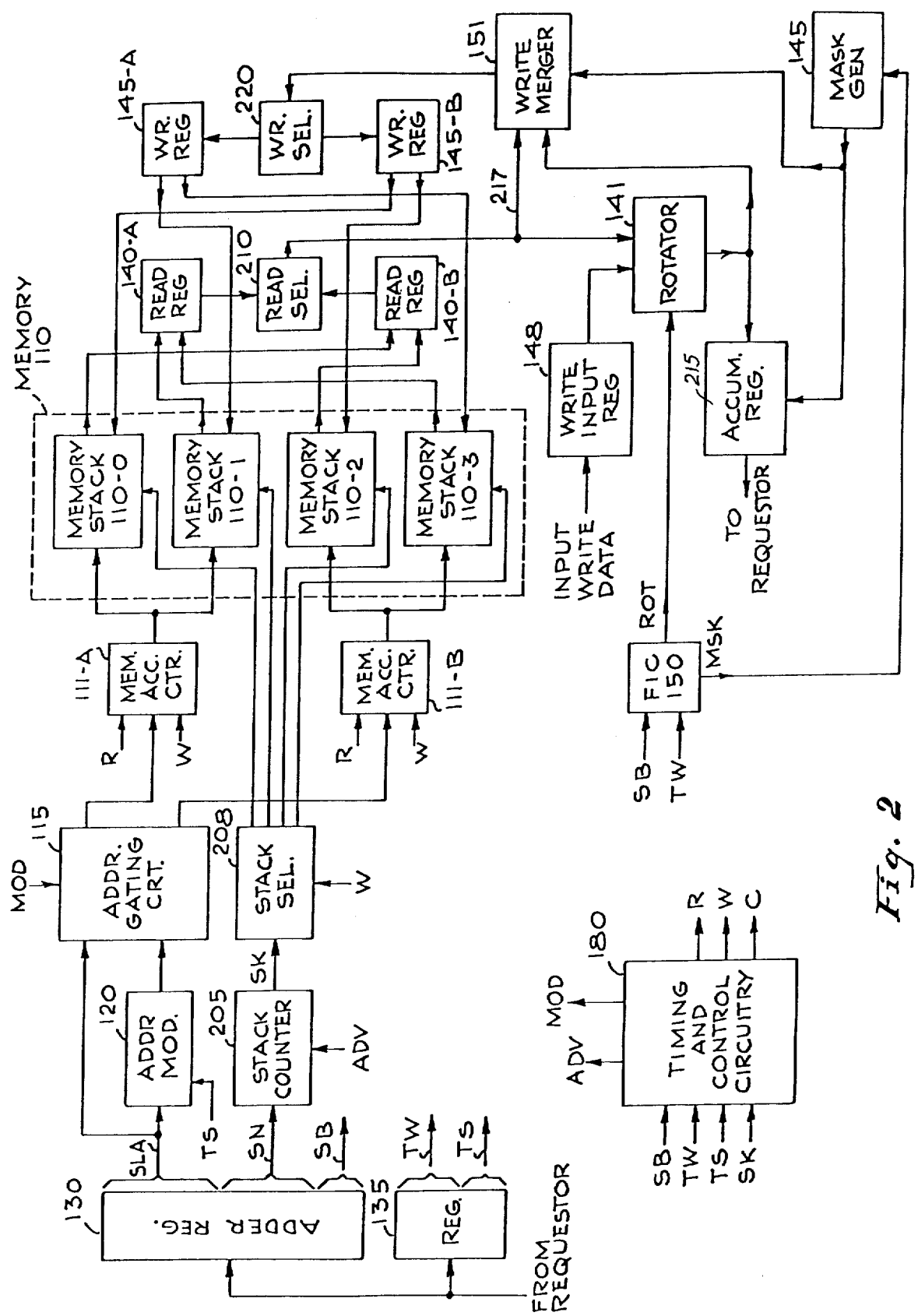
FIG. 2 is a block diagram of an improved memory accessing means in accordance with the present invention.

With the above description of the preferred embodiment of the cross-referenced Patent No. 3,781,812 as background, attention is now directed to FIG. 2 which illustrates how the multi-phase accessing features of the present invention may be implemented. The manner in which error checking, correcting, check code generating and error logging are additionally provided with hereinafter be described in connection with FIGS. 9 and 10. Reference is directed to this cross-referenced U.S Pat. No. 3,781,812 for more detailed information as to how like elements may typically be provided.

As shown in FIG. 2, a memory 110 is typically partitioned into four separate parts, each part hereinafter being referred to as a stack. The four stacks are designated as 110-0, 110-1, 110-2 and 110-3. Stacks 110-0 and 110-1 are addressed by a common memory access control 111-A, while stacks 110-2 and 110-3 are addressed by a common memory access control 111-B. A memory address register 130 applies a stack location address SLA to the memory access controls 111-A and 111-B via an optionally operable address modifier 120 and address gating circuitry 115, whereby to provide for accessing a selected location in each of one or more of the stacks 110-0 to 110-3, each location containing a plurality of memory cells.

FIG. 3 illustrates a typical example of how a 23-bit data field may be stored in the cells of three memory locations 112-1, 112-2 and 112-3 of stacks 110-1, 110-2 and 110-3, respectively, having a common stack location address SLA. For the purpose of this example, it is assumed that each memory location comprises 16 cells capable of storing 16 data bits. Each memory location may also include six additional cells for storing a 6-bit check code, the details of which will hereinafter be considered in connection with the modified embodiment of FIG. 9. An X in FIG. 3 indicates a cell storing a data bit of the desired 23-bit data field.

It will thus be understood that an address set up in address register 130 in FIG. 2 provides for addressing of the illustrate memory locations 112-0, 112-1, 112-2 and 112-3 shown in FIG. 3 by applying a common stack location address SLA, via address gating circuitry 115, to both of the memory access controls 111-A and 111-B. Memory access control 111-A serves to access memory locations 112-0 and 112-1 in stacks 110-0 and 110-1, respectively, and memory access control 111-B serves to access memory locations 112-2 and 112-3 in stacks 110-2 and 110-3, respectively. As pointed out earlier herein, accessing of the memory stacks is performed in accordance with the present invention in a particularly advantageous multi-phased, time-shared manner, rather than being simultaneously accessed in parallel as disclosed in the cross-referenced U.S. Pat. No. 3,781,812.

Figure 4:
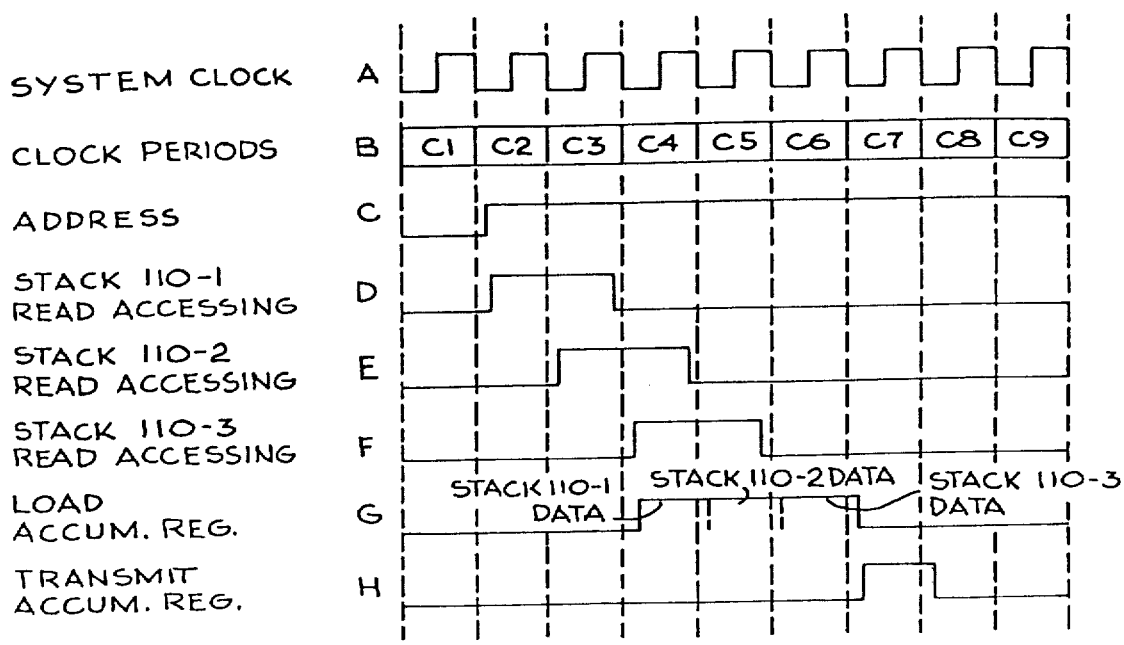
FIG. 4 is a series of timing graphs illustrating a typical read cycle performable by the embodiment of the invention shown in FIG. 2.

Reference is now directed to the graphs of FIG. 4 for consideration along with FIGS. 2 and 3. The graphs of FIG. 4 illustrate a typical read cycle performed by the embodiment of FIG. 2 for reading out the illustrative data field of FIG. 3 from stacks 110-1, 110-2 and 110-3. A typical system clock is illustrated by graph A of FIG. 4. Graph B illustrates the clock periods C1, C2, etc. occurring during the illustrated read cycle.

As indicated by graph C of FIG. 4, during the initial portion of clock period C1, a stack location address SLA is transferred from address register 130 to memory access controls 111-A and 111-B. For the illustrative 23-bit data field shown in FIG. 3, the stack location address SLA is assumed to correspond to location 112 in each stack. The address in address register 130 also includes a starting stack number SN which sets a stack counter 205 to an initial count SK. This initial count SK is in turn applied to a stack selector 208 for activating during clock period C3 only the stack corresponding thereto. For the example of FIG. 3 the stack number SN sets the stack counter 205 to a count corresponding to stack 110-1, since the desired data field begins in location 112-1 of stack 110-1.

As illustrated in graph D of FIG. 4, the accessing of stack 110-1 for a read operation begins in clock period C1 in response to a read signal R from timing and control circuitry 180 after the above described addressing illustrated in graph C is completed. In this regard, it is to be understood that appropriate control and timing signals for controlling the components of FIG. 2 in order to perform the operations being described herein, such as read signal R, can readily be provided by timing and control circuitry 180 in FIG. 2, which is generally analogous to the prior art timing and control unit 80 of the cross-referenced U.S. Pat. No. 3,781,812 shown in FIG. 1, and can likewise be provided in a conventional manner.

It is to be noted in FIG. 2 that the input information provided for a memory access not only includes the previously considered stack location address SLA and the stack number SN, but also includes (similarly to the preferred embodiment of the cross-referenced U.S. Pat. No. 3,781,812) information designating a starting bit SB stored in address register 130, and a transfer width TW and a transfer sign TS typically stored in another register 135. The SB output of register 130 and the TW and TS outputs of register 135 are applied to timing and control circuitry 180 for use in generating the control and timing signals provided thereby. SB and TW are also applied to field isolation circuitry FIC150 for controlling masking and rotation and TS is applied to address modifier 120 for use when address modification is required. The functions of SB, TW and TS in the embodiment of the present invention of FIG. 2 are basically similar to those disclosed in the cross-referenced U.S. Pat. No. 3,781,812.

Returning to the typical read cycle illustrated in FIG. 4, operations occurring during clock period C2 will now be considered. Initially, it is to be understood that because the time required to access a random access memory is typically relatively long as compared to the time required for performing logical operations during a cycle of a data processing system, it is to be expected that the portion of the data field in location 112-1 of stack 110-1 accessed during clock period C1 will not be available at the stack output for several cycles. In the example being considered, it will be assumed that data addressed for reading from a stack during a clock period will not be available for use until three clock periods later. Thus, as illustrated in graph D of FIG. 4 (which illustrates the read accessing period of stack 110-1), the data at location 112-1 of stack 110-1 addressed during clock period C1 will not be available for use until clock period C4, since readout from stack 110-1 is not completed until near the end of C3. Accordingly, as illustrated by graph E of FIG. 4, in order to increase the speed of overall memory accessing time, read accessing of the portion of the desired data field contained in location 112-2 of the next stack 110-2 is begun in clock period C3. This is accomplished as a result of timing and control circuitry 180 in FIG. 2 again providing a read accessing signal R to memory access controls 111-A and 111-B during C3, it being understood that stack counter 205 will have been advanced to its next count corresponding to stack 110-2 by an advance signal ADV provided at the end of C1. This advance signal ADV is generated by timing and control circuitry 180 in response to the starting bit SB and transfer width TW which for the assumed 23-bit data field of FIG. 3 indicates that a total of three stacks will have to be accessed to read out all of the assumed 23-bit data field. Thus, as illustrated in graphs D and E, the read accessing of stack 110-2 occurs concurrently with the read accessing of stack 110-1, but lagging by one clock period.

In the next occuring clock period C4, accessed stack data from stack 110-1 becomes available, as illustrated in graph G of FIG. 4. Also, as illustrated in graph F of FIG. 4, clock period C4 is additionally used to begin accessing of the stack 110-3 containing the remainder of the desired data field. Thus, during C4, timing and control circuitry 180 generates another read accessing signal R and, since stack counter 205 will have been advanced at the end of C3 to its next count corresponding to stack 110-3, read accessing of location 112-3 of stack 110-3 will be begun during C4.

As will be evident from graphs D, E and F in FIG. 4, the read accessing operations of stack 110-3 will lag those of stack 110-2 by one clock period and those of stack 110-1 by two clock periods.

In the next clock period C5, if a fourth stack access were required, then read accessing of this next stack 110-0 would be begun in C5 in a like manner as described for the previous stacks. However, since this fourth stack access is not required for the particular data field illustrated in FIG. 3, no further stack accessing is initiated during C5.

The data which becomes available from location 112-1 of stack 110-1 during clock period C4 is set up in a first read register 140-A in FIG. 2. Read register 140-A is shared by stacks 110-1 and 110-3, while stacks 110-0 and 110-2 share a second read register 140-B.

Also, during clock period C4 the data from location 112-1 of stack 110-1 which has been set up in read register 140-A is appropriately rotated and masked and loaded into accumulator register 215 of FIG. 2 as illustrated by graph G of FIG. 4. More specifically, during C4, read register 140-A is selected by read selector 210 in FIG. 2 so as to cause the stack 110-1 contents thereof to be applied to a rotator 141 which, in response to control signals ROT from FIC150, rotates the applied data field portion by an appropriate amount for storage in read data accumulator 215 in accordance with a desired format. While the stack 110-1 data field portion is being applied to accumulator register 215 from rotator 141, mask generator 145, in response to control signals MSK from FIC150, mask out those bits of the rotated data field portion which it is desired not be stored in the accumulator register 215.

As illustrated by graph E of FIG. 4, by the time the next following clock period C5 occurs, stack 110-2 will also have completed its reading operation so that the stack 110-2 data read out therefrom will be present in read register 145-B of FIG. 2. Accordingly, during C5, read selector 210 now selects the output from read register 140-B for rotation, masking and loading in accumulator register 215 (graph G of FIG. 4) in a like manner as described for the data field portion read out from stack 110-1 during C4. The particular rotation and masking provided during C5 again is determined by rotation and masking signals ROT and MSK provided by FIC150 to rotator 141 and mask generator 145, respectively.

It is of significance to note at this point in the description that the provision of a first shared read register 140-A for stacks 110-0 and 110-2 and a second shared read register 140-B for stacks 110-1 and 110-3 permits setting up the data read out from stack 110-2 in register 140-B as soon as it is available without concern as to whether the other read register 140-A is ready to receive such data following its use with stack 110-1 during C4, as would be necessary if only a single read register were provided.

Returning again to the specific example being considered with reference to FIGS. 3 and 4, it will be understood that, during the next following clock period C6, the final portion of the desired data field contained in location 112-3 of stack 110-3 will be present in read register 140-A, and in a similar manner as described for stacks 110-1 and 110-2, will be appropriately rotated, masked and loaded into accumulator register 215.

FIG. 5 schematically summarizes the above described serial, multi-phase loading into accumulator register 215 of FIG. 2 of the respective stack portions of the illustrative 23-bit data field of FIG. 3 during clock periods C4, C5 and C6. Diagram A of FIG. 5 illustrates the 24 individual bit storage locations 0-23 which may typically be provided in data accumulator register 215. For the particular exemplary operation being considered herein, it will be assumed that the desired 23-bit data field of FIG. 3 which is to be loaded into the accumulator register 215 after the completion of clock period C6 occupy bit locations 0-22 of register 215 with the most significant bit of the desired data field being stored in bit location 22, as illustrated in diagram D of FIG. 5.

Diagram B of FIG. 5 illustrates the loading during C4 of the first three bits of the desired data field of FIG. 3 contained in location 112-1 of memory stack 110-1 in bit storage locations 22, 21 and 20 of accumulator register 215. Diagram C of FIG. 5 illustrates the loading during C5 of the next sixteen bits of the desired data field of FIG. 3 contained in location 112-2 of memory stack 110-2 in bit storage location 19-4 of accumulator register 215, and diagram D of FIG. 5 illustrates the loading during C6 of the last four bits of the desired data field of FIG. 3 in bit storage locations 3-0 of data accumulator register 215. Thus, the total 23-bit desired data field of FIG. 3 will be contained in data accumulator register 215 at the completion of clock period C6. As illustrated by graph H of FIG. 4, a transmit signal is accordingly provided during the next clock period C7 for transmitting the contents of the accumulator register 215 to the requestor, thereby terminating the illustrative read operation of FIG. 5.

It will be understood that the rotation and masking provided by rotator 141 and mask generator 145 during each of clock periods C4, C5 and C6 in response to respective control signals ROT and MSK provided by FIC150 are such as to achieve the storing in accumulator register 215 of each data field portion read out from its respective stack in the manner illustrated in diagrams B, C and D of FIG. 5. For example, during C4 when the data field portion read out from the stack 110-1 is being loaded into accumulator register 215, rotator 141 will rotate the sixteen bits read out from location 112-1 of FIG. 3 so that the last three bits of location 112-1 (which are the first three bits of the desired data field) are applied to bit storage locations 23, 22 and 21 of the accumulator register 215, as shown in diagram B of FIG. 5. Also, during C4, mask generator 145 will mask out all bits accessed from location 112-1 of stack 110-1 except for the three bits of the desired data field so that only these three bits are stored in the particular bit locations of accumulator register 215 designated by rotator 141. During clock period C5, rotator 141 and mask generator 145 operate in response to FIC150 so that all sixteen bits of the desired data field portion read out from location 112-2 of stack 110-2 are stored in bit storage locations 19-4 of accumulator register 215, as shown in diagram C of FIG. 5. Lastly, during C6, rotator 141 and mask generator 145 operate in response to FIC150 to cause only the first four of the sixteen bits read out from location 112-2 of stack 110-2 (which are the last four bits of the desired data field) to be stored in bit locations 3-0 of accumulator register 215, as shown in diagram D of FIG. 5.

The foregoing description has thus described the manner in which the embodiment of FIG. 2 is constructed and arranged to perform the typical read cycle illustrated in FIG. 4 with respect to the 23-bit data field illustrated in FIG. 3 and contained in memory stacks 110-1, 110-2 and 110-3 as shown. Next to be considered is the manner in which the embodiment of FIG. 2 is constructed and arranged to perform the typical write cycle illustrated in FIG. 6.

Figure 6:
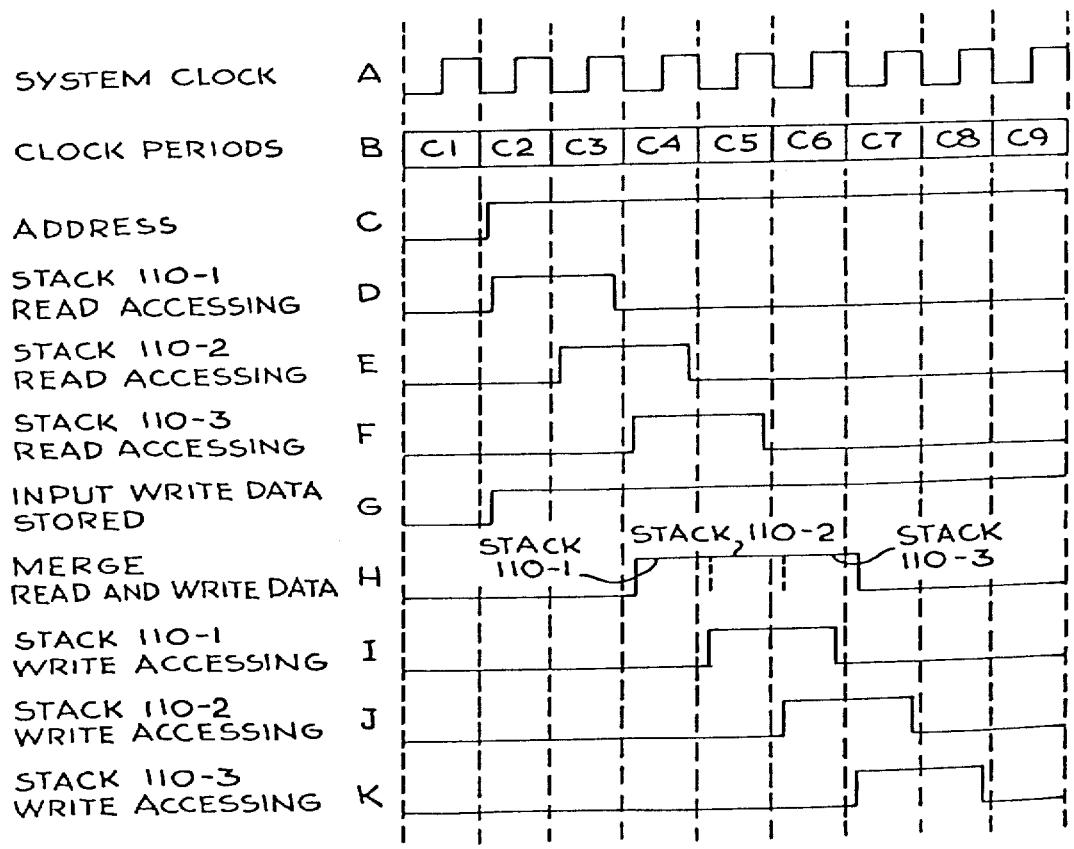
FIG. 6 is a series of timing graphs illustrating a typical write cycle performable by the embodiment of the invention shown in FIG. 2.

As in the preferred embodiment disclosed in the cross-referenced U.S. Pat. No. 3,781,812, a write operation in the embodiment of the present invention illustrated in FIG. 2 is such as to provide for writing into some of the cells of a selected data field contained in one or more memory stacks without affecting the data stored in other cells of the selected data field. Such a write operation is commonly referred to as a read-modify-write operation and a typical example thereof is illustrated in FIG. 6. Briefly, a write cycle such as illustrated in FIG. 6 involves first accessing each of the one or more stacks for reading out the selected data field portions contained therein in the same serial multi-phase manner previously described in connection with the read cycle of FIG. 4. However, for the write cycle, the data read out from each stack during respective clock periods C4, C5 and C6 is not rotated nor applied to accumulator register 215. Instead, the respective portion of the write input data applicable to each stack is appropriately rotated and then merged with the data read out from each stack. Appropriate masking is provided during merging so that only the desired bits of the selected data are modified. The merged result is then written back into the selected location of each stack.

The typical write cycle of FIG. 6 will now be considered in further detail. For this purpose, the same stack location address SLA illustrated in FIG. 3 which was used in describing the typical read cycle of FIG. 4 will also be used in describing the typical write cycle of FIG. 6. The starting bit SB and transfer width TW (i.e., field length) for this write cycle will be that appropriate to the particular write data which is to be written into the memory stacks. The input write data may, for example, comprise 19 bits $W_0$–$W_{18}$ such as illustrated in diagram A of FIG. 7 which shows these 19 input write bits stored in an input write register 148 which receives the input write data. It will be assumed that the purpose of this illustrative write operation is to modify the original field illustrated in FIG. 3 such that these 19 input write bits are stored in locations 112-1, 112-2 and 112-3 of memory stacks 110-1, 110-2 and 110-3, respectively, in the particular manner illustrated in diagram G of FIG. 7 wherein a "W" indicates a write bit and an "X" indicates an original (i.e., unchanged) bit.

As will be evident from a comparison of FIGS. 4 and 6, graphs A through F of the write cycle of FIG. 6 are the same as correspondingly lettered graphs of the read cycle of FIG. 5. This is the case because the same previously described read accessing of stacks 110-1, 110-2 and 110-3 occurs during the write cycle of FIG. 6. Accordingly, the description of the write cycle may proceed directly to graphs G through K of FIG. 6 which are specifically concerned with write-related operations performed during the write cycle.

Graph G in the write cycle of FIG. 6 indicates the storage during clock period C2 of the input write data in input write data register 148 of FIG. 2. Graph H of FIG. 6 indicates the merging of data read out from stacks 110-1, 110-2 and 110-3 during clock periods C4, C5 and C6, respectively, with respective rotated portions of the input write data in input write register 148. Appropriate masking for each stack is provided during merging. The writing of each merged result into its respective stack is initiated during the clock period following merging, as will be evident from graphs I, J, and K of FIG. 6.

More specifically, during C4 the original data read out from location 112-1 of stack 110-1 (FIG. 3) contained in read register 140-A, is applied, not to rotator 141, but directly via lines 147 in FIG. 2 to write merger 151. Also, during C4, the write data in input write register 148 is applied to rotator 141 which, in response to ROT signals from FIC150, appropriately rotates the write data for application to write merger 151 along with the stack 110-1 data from read register 140-A. Merger 151 merges the applied write and read data with masking being provided in accordance with MSK signals provided by FIC150. The merged result is applied to write selector 220 which selects write register 145-A to receive the merged result, since this is the appropriate write register for writing into stacks 110-1 and 110-3. The other write register 145-B is used for writing into stacks 110-0 and 110-2. For the particular example being considered, the contents of write register 145-A at the end of C4 is as illustrated in diagram B of FIG. 7.

During the next clock cycle C5 a write accessing signal W is generated by timing and control circuitry 180 in FIG. 2 so as to initiate writing of the merged write data contained in write register 145-A (diagram B of FIG. 7) into stack 110-1. Signal W is also applied to stack selector 208 in FIG. 2 which, in response to stack counter 205, activates stack 110-1 for initiating a writing operation during C5 (as illustrated by graph I in FIG. 6) at the same time that stack 110-3 is still in the process of performing a reading operation during C5 (graph F). It will be understood that such concurrent operation of stack 110-3 for reading and stack 110-1 for writing such as occurs during C5 reduces the overall time required for a memory write operation. The resulting contents of locations 112-1, 112-2 and 112-3 of stacks 110-1, 110-2 and 110-3, respectively, at the completion of writing in stack 110-1 are illustrated in diagram C of FIG. 7 which shows that write bit $W_0$ has been appropriately placed in location 112-1 of stack 110-1 in accordance with the desired final result illustrated in diagram G of FIG. 7. In this regard, it will be understood that the rotation and masking control signals ROT and MSK provided by FIC150 during C4 in response to TW and SB are such as to achieve the writing in stack 110-1 illustrated in diagram C of FIG. 7.

Figure 7:
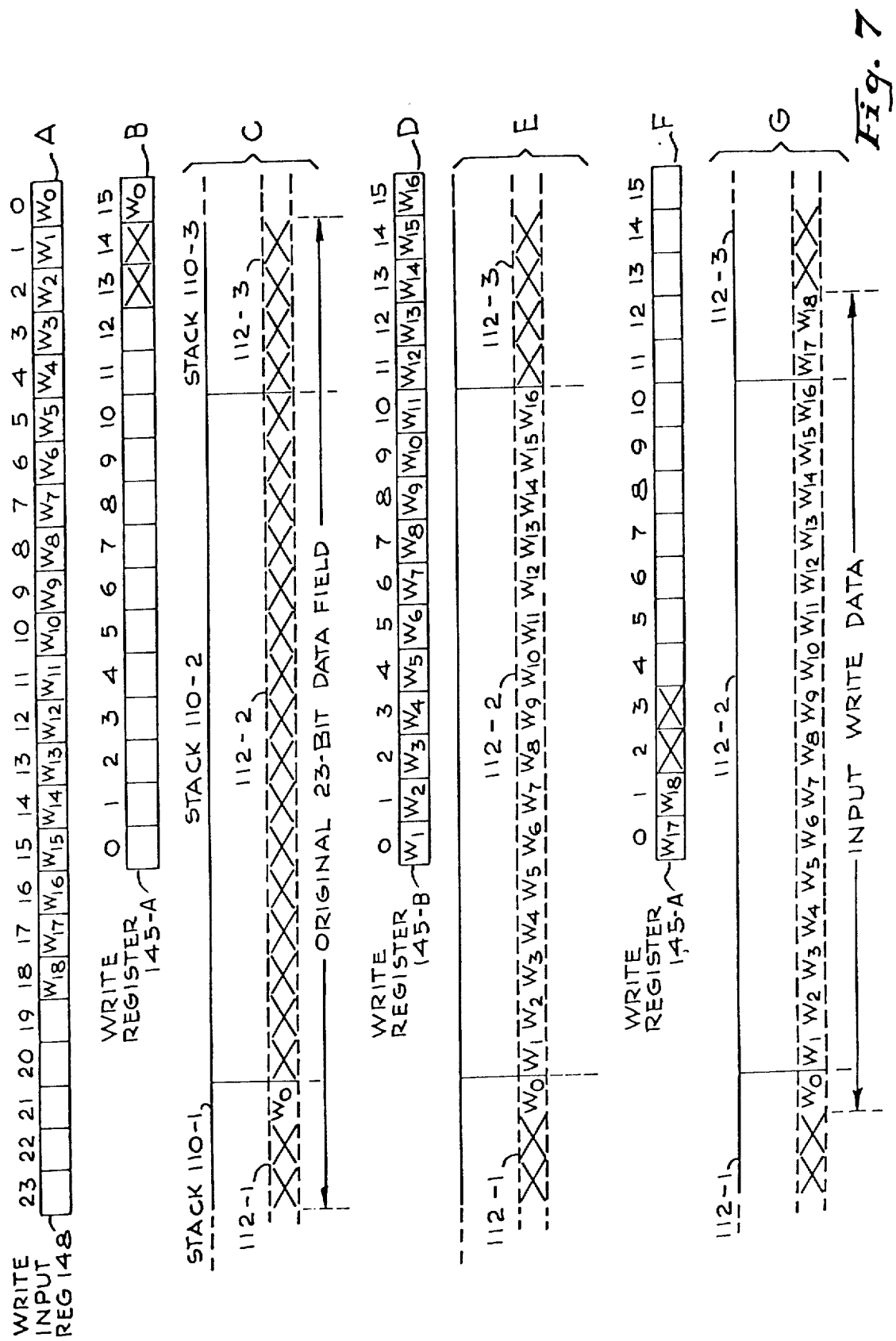
FIG. 7 is a series of diagrams illustrating the operation of the embodiment of FIG. 2 during performance of the write cycle of FIG. 5.

From the foregoing description of the rotation, masking, merging and writing of the appropriate input write data portion into stack 110-1 with reference to FIGS. 6 and 7, it should also be evident how each respective write data portion of the input write data is likewise written into each of stacks 110-2 and 110-3 during subsequent clock periods so as to achieve the final result illustrated in diagram G of FIG. 7. In this regard, it is to be noted that diagram D in FIG. 7 illustrates the storage during C5 of the stack 110-2 write data portion comprised of write bits $W_1$-$W_{16}$ in write register 145-B, while diagram E in FIG. 7 illustrates the resulting contents of stack locations 112-1, 112-2 and 112-3 after completion of writing in stack 110-2. Similarly, diagram F in FIG. 7 illustrates the storage during C6 of the stack 110-3 write data portion comprised of write bits $W_{17}$ and $W_{18}$ in write register 145-A, while diagram G in FIG. 7 illustrates the resulting contents of stack locations 112-1, 112-2 and 112-3 after completion of writing in stack 110-3 which, of course, is the final desired result for the example being assumed.

It will be apparent from the above description of a typical write cycle that the advantages of serial, multi-phase accessing are realized during a write cycle as well as during a read cycle. Also, similar advantages are obtained for writing purposes by using the two shared write registers 145-A and 145-B for stacks 110-1, 110-3 and stacks 110-0, 110-2, respectively, as are obtained by the provision of two shared read registers 140-A and 140-B, as described previously herein. Furthermore, with regard to write operations, it will be evident from the description of the illustrative write cycle of FIG. 6 and particularly graphs D-F and I-K thereof, that not only are the write accessing times of the individual stacks overlapped as a result of the serial multi-phase write accessing provided, but also the multi-phase write accessing times of the stacks are advantageously overlapped with the multi-phase read accessing times of the stacks so that the overall read-modify-write operation provided by a write cycle are achieved significantly faster than would otherwise be possible.

The examples of read and write accessing described herein have been such that all of the locations of the stacks required to be accessed had the same common stack location address SLA. Thus, accessing of the stacks did not involve the address modifier 120 in FIG. 2. This is not the case for the example of FIG. 8 which illustrates a selected data field that extends over two stack location addresses SLA-1 and SLA-2. As shown, an initial portion of the selected data field is contained at a first stack location address SLA-1 indicated by locations 112-2 and 112-3 of stacks 110-2 and 110-3, respectively, in FIG. 8. The remaining portion of this selected data field is contained in a next higher stack location address SLA-2 indicated by location 113-0 of stack 110-0.

In handling the type of data field illustrated in FIG. 8, address SLA-1 would be initially applied to both memory access controls 111-A and 111-B to provide for serial, multi-phase accessing of stacks 110-2 and 110-3 containing the initial portion of the selected data field in the same manner as for the previously described accessing examples. During the clock period in which accessing of stack 110-3 is begun, the count of stack counter 205 will be at its last count value; however, the values of SB and TW will indicate that at least one more stack is still to be accessed. Timing and control circuitry 180 responds to this condition by providing a control signal MOD to address modifier 120. This control signal MOD causes address modifier 120 to modify the SLA-1 address applied thereto so as to cause the next higher stack location address SLA-2 to be applied to memory access control 111-A when stack 110-0 is activated by the stack counter 205 for accessing during the next clock period, thereby providing for accessing of location 113-0 of stack 110-0 which contains the remaining data field portion. Of course, if the selected data field extended over two different SLA values and field accessing of the stacks were in a reverse direction (as would be indicated by TS), then the modification provided by address modifier 120 would be such as to cause the next lower selected location address to be applied to the appropriate memory access control during the appropriate clock period.

Incorporation of Error Checking, Correcting Check Code Generating and Error Logging Means in FIG. 2 (FIGS. 9-13)

Figure 9:
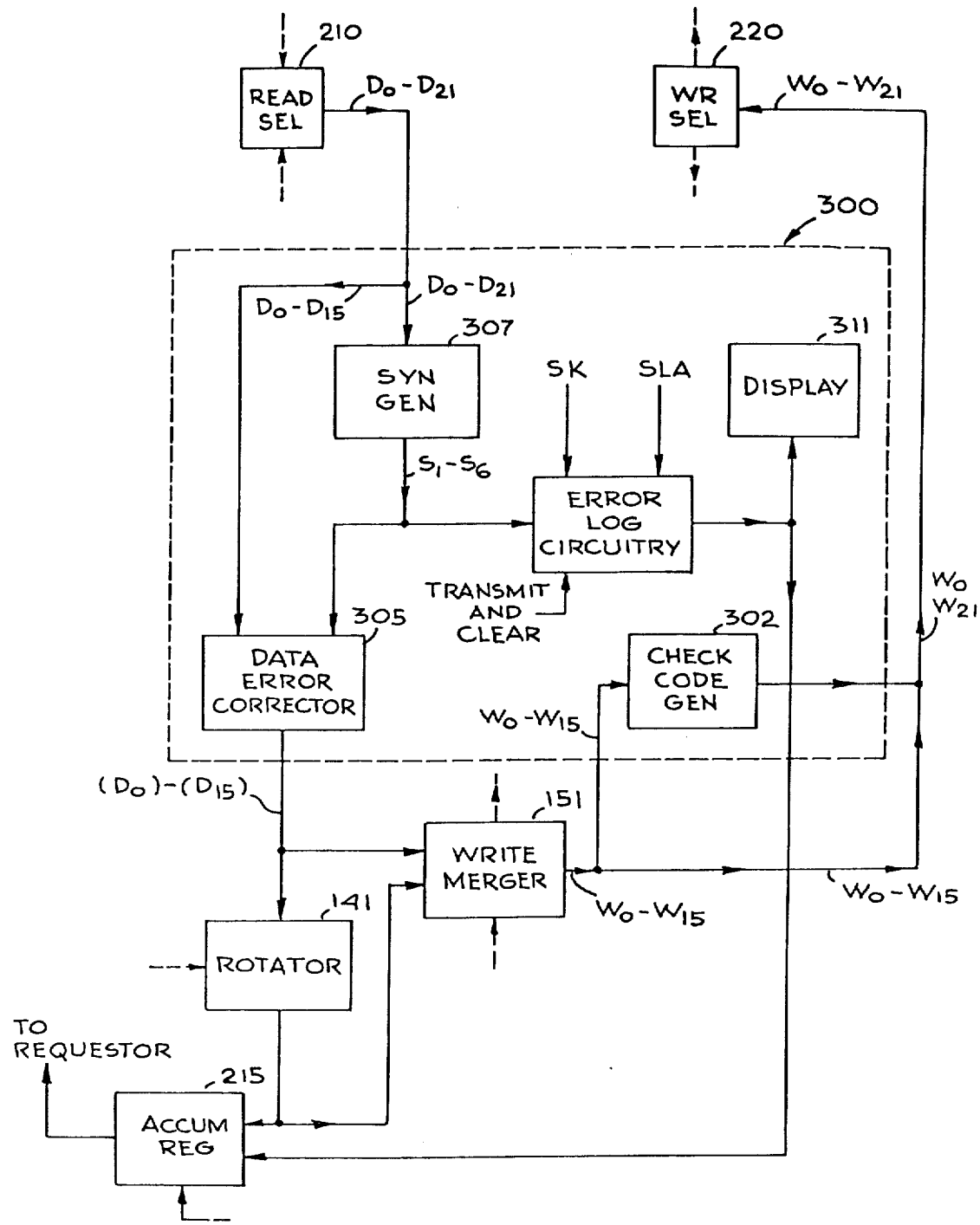
FIG. 9 is a block diagram illustrating how an error checking, correcting and error logging capability may be provided for the memory system illustrated in FIG. 2.

Reference is now directed to FIG. 9 which illustrates how the multiphase memory system of FIG. 2 may advantageously be modified to incorporate error checking, correcting, check code generating and error logging means, the additional means provided for this purpose being generally indicated in FIG. 9 by the number 300. It will be understood with regard to FIG. 9 that read selector 210, rotator 141, write merger 151, write selector 220 and accumulator register 215 correspond to respective like-numbered elements in FIG. 2.

For the purpose of describing the construction and operation of the error checking, correcting, check code generating and error logging means generally indicated by the numeral 300 in FIG. 9, it will be assumed that each memory location (such as, for example, memory location 112-2 of stack 110-2 in FIG. 3) comprises a total of 22 cells for storing 16 data bits $D_0$–$D_{15}$ plus a 6-bit check code $D_{16}$–$D_{21}$. As is well known in the art, a 6-bit check code is capable of providing a single error correctable, double error detectable code for sixteen data bits as well as also providing for the detection of certain other types of multiple bit errors involving three or more erroneous bits. Hence, the provision of a 6-bit check code provides the capability for detecting all single bit and double bit errors and certain multiple bit errors, and also provides for correcting all single bit errors.

As illustrated in FIG. 9, the 6-bit check code may be generated in a conventional manner during the previously described writing operation. More specifically, the sixteen data bits $W_0$–$W_{15}$ provided at the output of the write merger 151 during a writing operation are applied to a check code generator 302 for generating the appropriate six check code bits $W_{16}$–$W_{21}$ corresponding thereto. These check code bits $W_{16}$–$W_{21}$ are then applied to the write selector 220 along with the data bits $W_0$–$W_{15}$ for writing of the resulting 22-bit word $W_0$–$W_{21}$ into the selected stack location, as described previously. The logical encoding functions provided by the check code generator 302 for generating the check code bits $W_{16}$–$W_{21}$ from the data bits $W_0$–$W_{15}$ are set forth below wherein a plus "+" in these equations represents a logical exclusive or function:

$$W_{16} = (W_0 + W_1 + W_2 + W_3 + W_4 + W_5 + W_6 + W_7)'$$

$$W_{17} = (W_0 + W_1 + W_2 + W_8 + W_9 + W_{10} + W_{11} + W_{12})'$$

$$W_{18} = (W_3 + W_4 + W_8 + W_9 + W_{10} + W_{13} + W_{14} + W_{15})'$$

$$W_{19} = (W_C + W_3 + W_5 + W_6 + W_8 + W_{11} + W_{13} + W_{14})'$$

$$W_{20} = (W_1 + W_5 + W_7 + W_9 + W_{11} + W_{12} + W_{13} + W_{15})'$$

$$W_{21} = (W_2 + W_4 + W_6 + W_7 + W_{10} + W_{12} + W_{14} + W_{15})'$$

Next to be considered is the manner in which the 6-bit check code provided as described above is used during reading operations. As indicated in FIG. 9, a total of 22 bits $D_0$–$D_{21}$ comprised of 16 data bits $D_0$–$D_{15}$ and six check code bits $D_{16}$–$D_{21}$ are read from a selected location of a single stack during each read operating cycle. However, it will be noted in FIG. 9 that the data bits $D_0$–$D_{15}$ are not applied directly to rotator 141 as in FIG. 2, but rather are first applied to a data error corrector 305 to permit correction of a single bit error which may have been detected therein. For this purpose the total 22 bits $D_0$–$D_{21}$ read from a stack during a read operating cycle, including the 16 data bits $D_0$–$D_{15}$ as well as the six check code bits $D_{16}$–$D_{21}$, are applied to a syndrome generator 307 as shown. The syndrome generator 307 is constructed and arranged to logically combine the bits $D_0$–$D_{21}$ to produce six syndrome bits $S_1$–$S_6$ in accordance with the following logical relationships wherein a "+" represents a logical exclusive or function:

$$S_1 = (D_0 + D_1 + D_2 + D_3 + D_4 + D_5 + D_6 + D_7 + D_{16})'$$

$$S_2 = (D_0 + D_1 + D_2 + D_8 + D_9 + D_{10} + D_{11} + D_{12} + D_{17})'$$

$$S_3 = (D_3 + D_4 + D_8 + D_9 + D_{10} + D_{13} + D_{14} + D_{15} + D_{18})'$$

$$S_4 = (D_0 + D_3 + D_5 + D_6 + D_8 + D_{11} + D_{13} + D_{14} + D_{19})'$$

$$S_5 = (D_1 + D_5 + D_7 + D_9 + D_{11} + D_{12} + D_{13} + D_{15} + D_{20})'$$

$$S_6 = (D_2 + D_4 + D_6 + D_7 + D_{10} + D_{12} + D_{14} + D_{15} + D_{21})'$$

It will be understood that the logical functions performed by the check code generator 302 set forth previously and those set forth above for the syndrome generator 307 are readily implementable in various known ways by those skilled in the art. For example, the check code generator 307 may be implemented using Fairchild CTL 9822, CTL 9838 and CTL 9828 integrated circuits, while the syndrome generator 307 may be implemented using Fairchild CTL 9822 and CTL 9828 integrated circuits.

The interpretations of the 64 possible values which may result for the six syndrome bits $S_1$–$S_6$ produced at the output of the syndrome generator 307 in FIG. 9 are set forth in the table below:

| SYNDROME BITS | | | | | | |
|---|---|---|---|---|---|---|
| $S_1$ | $S_2$ | $S_3$ | $S_4$ | $S_5$ | $S_6$ | INTERPRETATION |
| 0 | 0 | 0 | 0 | 0 | 0 | No Error |
| 0 | 0 | 0 | 0 | 0 | 1 | Check Bit $D_{21}$ Error |
| 0 | 0 | 0 | 0 | 1 | 0 | Check Bit $D_{20}$ Error |
| 0 | 0 | 0 | 0 | 1 | 1 | Even Error |
| 0 | 0 | 0 | 1 | 0 | 0 | Check Bit $D_{19}$ Error |
| 0 | 0 | 0 | 1 | 0 | 1 | Even Error |
| 0 | 0 | 0 | 1 | 1 | 0 | Even Error |
| 0 | 0 | 0 | 1 | 1 | 1 | Multiple Odd Error |
| 0 | 0 | 1 | 0 | 0 | 0 | Check Bit $D_{18}$ Error |
| 0 | 0 | 1 | 0 | 0 | 1 | Even Error |
| 0 | 0 | 1 | 0 | 1 | 0 | Even Error |
| 0 | 0 | 1 | 0 | 1 | 1 | Data Bit $D_{15}$ Error |
| 0 | 0 | 1 | 1 | 0 | 0 | Even Error |
| 0 | 0 | 1 | 1 | 0 | 1 | Data Bit $D_{14}$ Error |
| 0 | 0 | 1 | 1 | 1 | 0 | Data Bit $D_{13}$ Error |
| 0 | 0 | 1 | 1 | 1 | 1 | Even Error |
| 0 | 1 | 0 | 0 | 0 | 0 | Check Bit $D_{17}$ Error |
| 0 | 1 | 0 | 0 | 0 | 1 | Even Error |
| 0 | 1 | 0 | 0 | 1 | 0 | Even Error |
| 0 | 1 | 0 | 0 | 1 | 1 | Data Bit $D_{12}$ Error |
| 0 | 1 | 0 | 1 | 0 | 0 | Even Error |
| 0 | 1 | 0 | 1 | 0 | 1 | Multiple Odd Error |
| 0 | 1 | 0 | 1 | 1 | 0 | Data Bit $D_{11}$ Error |
| 0 | 1 | 0 | 1 | 1 | 1 | Even Error |
| 0 | 1 | 1 | 0 | 0 | 0 | Even Error |
| 0 | 1 | 1 | 0 | 0 | 1 | Data Bit $D_{10}$ Error |
| 0 | 1 | 1 | 0 | 1 | 0 | Data Bit $D_9$ Error |
| 0 | 1 | 1 | 0 | 1 | 1 | Even Error |
| 0 | 1 | 1 | 1 | 0 | 0 | Data Bit $D_8$ Error |
| 0 | 1 | 1 | 1 | 0 | 1 | Even Error |
| 0 | 1 | 1 | 1 | 1 | 0 | Even Error |
| 0 | 1 | 1 | 1 | 1 | 1 | Multiple Odd Error |
| 1 | 0 | 0 | 0 | 0 | 0 | Check Bit $D_{16}$ Error |
| 1 | 0 | 0 | 0 | 0 | 1 | Even Error |
| 1 | 0 | 0 | 0 | 1 | 0 | Even Error |
| 1 | 0 | 0 | 0 | 1 | 1 | Data Bit $D_7$ Error |
| 1 | 0 | 0 | 1 | 0 | 0 | Even Error |
| 1 | 0 | 0 | 1 | 0 | 1 | Data Bit $D_6$ Error |
| 1 | 0 | 0 | 1 | 1 | 0 | Data Bit $D_5$ Error |

-continued

| SYNDROME BITS | | | | | | |
|---|---|---|---|---|---|---|
| $S_1$ | $S_2$ | $S_3$ | $S_4$ | $S_5$ | $S_6$ | INTERPRETATION |
| 1 | 0 | 0 | 1 | 1 | 1 | Even Error |
| 1 | 0 | 1 | 0 | 0 | 0 | Even Error |
| 1 | 0 | 1 | 0 | 0 | 1 | Data Bit $D_4$ Error |
| 1 | 0 | 1 | 0 | 1 | 0 | Multiple Odd Error |
| 1 | 0 | 1 | 0 | 1 | 1 | Even Error |
| 1 | 0 | 1 | 1 | 0 | 0 | Data Bit $D_3$ Error |
| 1 | 0 | 1 | 1 | 0 | 1 | Even Error |
| 1 | 0 | 1 | 1 | 1 | 0 | Even Error |
| 1 | 0 | 1 | 1 | 1 | 1 | Multiple Odd Error |
| 1 | 1 | 0 | 0 | 0 | 0 | Even Error |
| 1 | 1 | 0 | 0 | 0 | 1 | Data Bit $D_2$ Error |
| 1 | 1 | 0 | 0 | 1 | 0 | Data Bit $D_1$ Error |
| 1 | 1 | 0 | 0 | 1 | 1 | Even Error |
| 1 | 1 | 0 | 1 | 0 | 0 | Data Bit $D_0$ Error |
| 1 | 1 | 0 | 1 | 0 | 1 | Even Error |
| 1 | 1 | 0 | 1 | 1 | 0 | Even Error |
| 1 | 1 | 0 | 1 | 1 | 1 | Multiple Odd Error |
| 1 | 1 | 1 | 0 | 0 | 0 | Multiple Odd Error |
| 1 | 1 | 1 | 0 | 0 | 1 | Even Error |
| 1 | 1 | 1 | 0 | 1 | 0 | Even Error |
| 1 | 1 | 1 | 0 | 1 | 1 | Multiple Odd Error |
| 1 | 1 | 1 | 1 | 0 | 0 | Even Error |
| 1 | 1 | 1 | 1 | 0 | 1 | Multiple Odd Error |
| 1 | 1 | 1 | 1 | 1 | 0 | Multiple Odd Error |
| 1 | 1 | 1 | 1 | 1 | 1 | Even Error |

In order to correct single bit errors in data bits $D_0$–$D_{15}$ read from a stack during a read operating cycle, the syndrome bits $S_1$–$S_6$ are applied to a data error corrector 305 along with the data bits $D_0$–$D_{15}$ as shown in FIG. 9. It will be apparent from the above syndrome pattern table that the particular syndrome patterns representing single data bit errors are as follows:

| Data Bit | Single Data Bit Error Patterns | | | | | |
|---|---|---|---|---|---|---|
| | $S_1$ | $S_2$ | $S_3$ | $S_4$ | $S_5$ | $S_6$ |
| $D_0$ | 1 | 1 | 0 | 1 | 0 | 0 |
| $D_1$ | 1 | 1 | 0 | 0 | 1 | 0 |
| $D_2$ | 1 | 1 | 0 | 0 | 0 | 1 |
| $D_3$ | 1 | 0 | 1 | 1 | 0 | 0 |
| $D_4$ | 1 | 0 | 1 | 0 | 0 | 1 |
| $D_5$ | 1 | 0 | 0 | 1 | 1 | 0 |
| $D_6$ | 1 | 0 | 0 | 1 | 0 | 1 |
| $D_7$ | 1 | 0 | 0 | 0 | 1 | 1 |
| $D_8$ | 0 | 1 | 1 | 1 | 0 | 0 |
| $D_9$ | 0 | 1 | 1 | 0 | 1 | 0 |
| $D_{10}$ | 0 | 1 | 1 | 0 | 0 | 1 |
| $D_{11}$ | 0 | 1 | 0 | 1 | 1 | 0 |
| $D_{12}$ | 0 | 1 | 0 | 0 | 1 | 1 |
| $D_{13}$ | 0 | 0 | 1 | 1 | 1 | 0 |
| $D_{14}$ | 0 | 0 | 1 | 1 | 0 | 1 |
| $D_{15}$ | 0 | 0 | 1 | 0 | 1 | 1 |

Accordingly, the data error corrector 305 in FIG. 9 operates to detect the above single data bit syndrome error patterns and, in response thereto, to invert the particular data bit corresponding to the detected single data bit syndrome error pattern. If no such single data bit error is present, the data bits $D_0$–$D_{15}$ will be outputted unchanged. For example, if data bit $D_0$ is read from a stack during a read operating cycle as a "1" and the syndrome generator provides a single data bit syndrome error pattern of $S_1$–$S_6$=110100 indicating $D_0$ is in error, data error corrector 305 will then operate in response to this syndrome error pattern to invert $D_0$ and thereby provide a "0" value for $D_0$ at the output of the data error corrector 305.

From the foregoing, it will be evident that the logical functions performed by the data error corrector 305 in FIG. 9 may be represented by the following equations, wherein the data error corrector outputs are indicated as ($D_0$), ($D_1$), etc.; and wherein a "+" represents a logical "or" function:

$$(D_0) = J_0 D_0' + J_0' D_0; \ J_0 = S_1 S_2 S_3' S_4 S_5' S_6'$$

$$(D_1) = J_1 D_1' + J_1' D_1; \ J_1 = S_1 S_2 S_3' S_4' S_5 S_6'$$

$$(D_2) = J_2 D_2' + J_2' D_2; \ J_2 = S_1 S_2 S_3' S_4' S_5' S_6$$

$$(D_3) = J_3 D_3' + J_3' D_3; \ J_3 = S_1 S_2' S_3 S_4 S_5' S_6'$$

$$(D_4) = J_4 D_4' + J_4' D_4; \ J_4 = S_1 S_2' S_3 S_4' S_5' S_6$$

$$(D_5) = J_5 D_5' + J_5' D_5; \ J_5 = S_1 S_2' S_3' S_4 S_5 S_6'$$

$$(D_6) = J_6 D_6' + J_6' D_6; \ J_6 = S_1 S_2' S_3' S_4 S_5' S_6$$

$$(D_7) = J_7 D_7' + J_7' D_7; \ J_7 = S_1 S_2' S_3' S_4' S_5 S_6$$

$$(D_8) = J_8 D_8' + J_8' D_8; \ J_8 = S_1' S_2 S_3 S_4 S_5' S_6'$$

$$(D_9) = J_9 D_9' + J_9' D_9; \ J_9 = S_1' S_2 S_3 S_4' S_5 \ S_6'$$

$$(D_{10}) = J_{10} D_{10}' + J_{10}' D_{10}; \ J_{10} = S_1' S_2 S_3 S_4' S_5' S_6$$

$$(D_{11}) = J_{11} D_{11}' + J_{11}' D_{11}; \ J_{11} = S_1' S_2 S_3' S_4 S_5 S_6'$$

$$(D_{12}) = J_{12} D_{12}' + J_{12}' D_{12}; \ J_{12} = S_1' S_2 S_3' S_4' S_5 S_6$$

$$(D_{13}) = J_{13} D_{13}' + J_{13}' D_{13}; \ J_{13} = S_1' S_2' S_3 S_4 S_5 S_6'$$

$$(D_{14}) = J_{14} D_{14}' + J_{14}' D_{14}; \ J_{14} = S_1' S_2' S_3 S_4 S_5' S_6$$

$$(D_{15}) = J_{15} D_{15}' + J_{15}' D_{15}; \ J_{15} = S_1' S_2' S_3 S_4' S_5 S_6$$

It will be understood that the above described operation of the data error corrector 305 of FIG. 9 may be implemented in various known ways by those skilled in the art. For example, such operation may be implemented using Fairchild CTL 9822 and CTL 9839 integrated circuits.

It is of significance to note with regard to the check code generator 302, syndrome generator 307 and data error corrector 305 of FIG. 9 that the serial multi-phase accessing of the memory stacks previously described herein makes it possible to limit the bit width requirements of these components to that required for only a single memory stack access, even though the total data field accessed from the memory is significantly greater. In other words, the error checking, correcting and check code generating means are time-shared by the memory stacks so that a much greater error detection and correction capability may be provided in accordance with the invention than would otherwise be economically possible if these operations were performed on the total data field.

As shown in FIG. 9, the detected syndrome pattern $S_1$–$S_6$ is not only applied to data error corrector 305 for correction of single data bit errors as described above, but is also applied to error log circuitry 308 along with the stack count SK and stack location address SLA (FIG. 2) for providing error logging on a predetermined priority basis in accordance with the invention. As also shown in FIG. 9, the error information currently logged in the error log circuitry 308 is transferable to the accumulator register 215 and/or a display 311 or other recording device in response to a transmit and clear signal which may be provided, for example, by an associated data processor (not shown).

Figure 10:
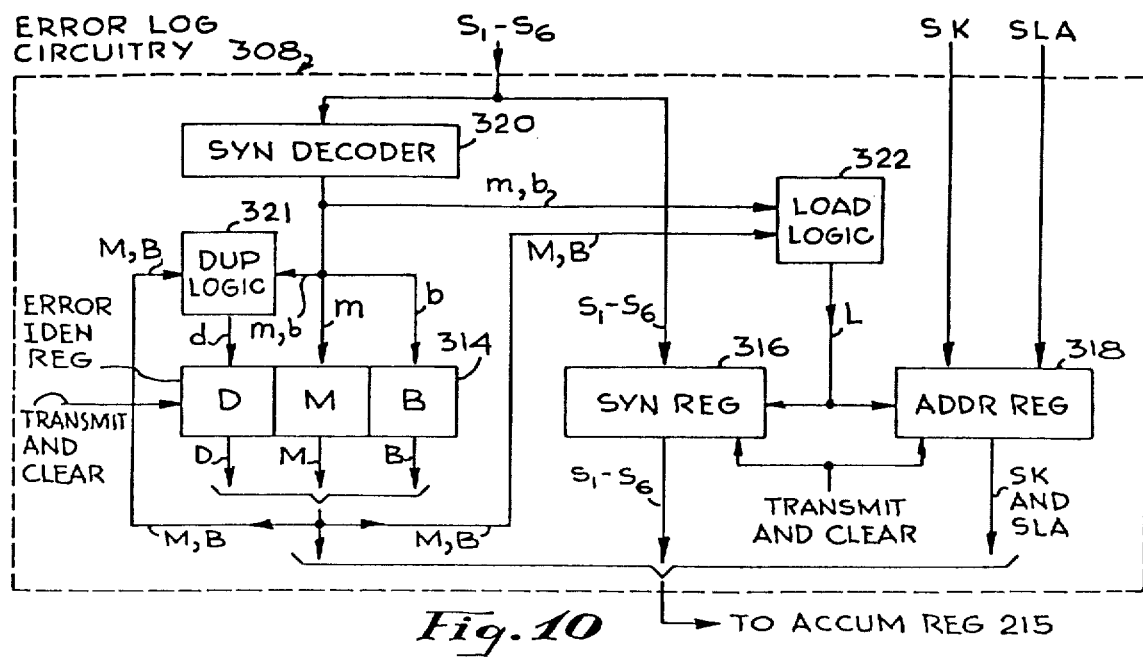
FIG. 10 is a block diagram which more specifically illustrates the error logging portion of FIG. 9.

Referring now to FIG. 10, illustrated therein is a preferred form of the error logic circuitry 308 of FIG. 9. It will be seen that the error log circuitry 308 includes an error identification register 314 responsive to a syndrome decoder 320 and duplicate logic 321, and a syndrome register 316 and an address register 318 responsive to load logic 322.

The error identification register 314 serves to store in respective flip-flops thereof information concerning the occurrence of particular types of errors occurring since the last clearing based on the detected syndrome error patterns during that period. For the purposes of this description, it will be assumed as an example that register 314 has a format providing for storage of a single bit error B, a multiple bit error M and a duplicate error D. Accordingly, syndrome decoder 320 decodes the syndrome bits $S_1-S_6$ to provide input signals b and m for controlling respective flip-flops B and M of register 314, while duplicate logic 321 responds to these input signals b and m as well as to the output signals M and B from these flip-flops for providing an input signal d for flip-flop D of register 314 so as to permit it to indicate the occurrence of more than one error.

Syndrome register 316 in FIG. 10 serves to store the error syndrome pattern $S_1-S_6$ having the highest priority detected since the last clearing, while address register 318 serves to store the corresponding stack location address SLA and stack count SK information so as to identify the particular stack and stack location address thereof for which the particular syndrome error pattern stored in syndrome register 316 was obtained. The loading of syndrome register 316 and address register 318 is controlled by load logic 322 in response to signals m, b, M and B for establishing the desired priorities for loading a syndrome error pattern and its corresponding address into registers 316 and 318.

It will thus be understood from the foregoing description of the error log circuitry 308 of FIG. 9 that it serves to store in error identification register 314 information about the type of errors occurring since the last clearing thereof, to store in syndrome register 316 the syndrome pattern of the highest priority error occurring since the last clearing, and to store in address register 318 the stack location address SLA and stack count SK identifying the corresponding memory stack location for which the syndrome error pattern stored in syndrome register 316 was obtained. As indicated in FIGS. 9 and 10 a transmit and clear signal serves to clear registers 314, 316 and 318 when the logged information is transmitted.

Thus, the operation of the error log circuitry 308 of FIG. 10 in the example being assumed is such that, for each stack access during a memory operating cycle, the detected syndrome error pattern $S_1-S_6$ generated during the cycle is decoded by syndrome decoder 320 so as to provide appropriate signals b and m for setting flip-flop B if the syndrome pattern indicates a single bit error or for setting flip-flop M if a multiple error is indicated, or for setting neither flip-flop B nor M if neither a single bit nor a multiple bit error is indicated by the syndrome pattern. If a single or multiple bit error is indicated by the syndrome pattern and one of flip-flops M and B is already set, because of a previously detected error since the last clearing, then duplicate logic 321 in response to b, m, B and M provides a signal d which sets flip-flop D. It will be understood that, once set, the flip-flops M, B and D remain set until cleared.

With regard to the loading of the syndrome register 316 and address register 318 by the load logic 322, it will be assumed for the purposes of this description that a multiple bit error has a higher priority than a single bit error and that a first occurring error of one type has a higher priority than a later occurring error of the same type. Thus, the syndrome register 316 and address register 318 will respectively contain the error syndrome pattern and corresponding address of the first occurring highest priority syndrome error pattern since the last clearing. Accordingly, load logic 322 is designed so that, if no error syndrome pattern is stored in syndrome register 316, a single or multiple bit syndrome error pattern generated during a stack access will be loaded into syndrome register 316 with the corresponding SLA and SK address information being loaded into address register 318. If a single bit syndrome error pattern is already stored in syndrome register 316 and a multiple bit syndrome error pattern occurs, then load logic 322 causes the single bit syndrome error pattern and corresponding address in registers 316 and 318 to be replaced by the multiple bit syndrome error pattern and corresponding address. Finally, if either a single or a multiple bit syndrome error pattern occurs and a syndrome error of the same type is already stored in syndrome register 316, then load logic 322 will not load this second occurring single or multiple bit syndrome error pattern, as the case may be, thereby permitting the first occurring one to be retained in syndrome register 316 along with its corresponding address in address register 318.

Figure 11:
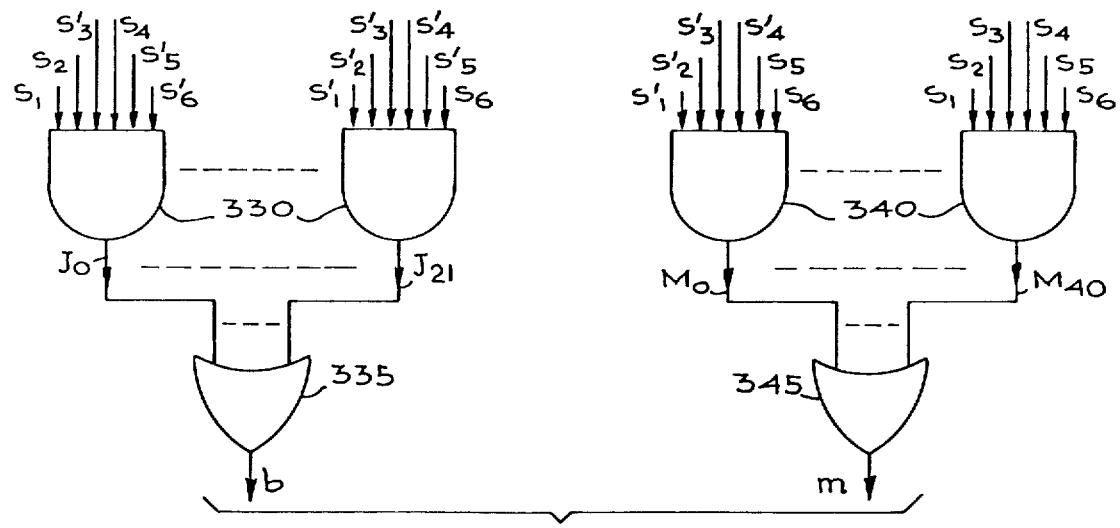
FIGS. 11-13 are logical diagrams providing examples of how particular portions of FIG. 10 may be implemented.

It will be understood that the construction and arrangement of the various parts of the error log circuitry 308 of FIG. 10 for providing the above described operations for the examples assumed may be indicated by logical equations. For example, appropriate logical equations for the syndrome decoder 320 are as follows, wherein the "+" indicates a logical or:

$$b = J_0 + J_1 + J_2 + \cdots J_{21}$$

$$m = M_0 + M_1 + M_2 + \cdots M_{40}$$

wherein the terms $J_0-J_{21}$ respectively correspond to the states of $S_1-S_6$ for the twenty-two single bit syndrome patterns contained in the previously presented syndrome bit table, and wherein the terms $M_0-M_{40}$ respectively correspond to the states of $S_1-S_6$ for the forty-one multiple bit syndrome patterns contained in this syndrome table. In this regard, it will be noted that the states of $S_1-S_6$ for $J_0-J_{15}$ have previously been set forth herein in providing equations for the data error corrector 305 in FIG. 9, and may accordingly be provided in a like manner for the remaining $J_{16}-J_{21}$ single bit error patterns as well as for the multiple bit error patterns $M_0-M_{40}$. For example, FIG. 11 illustrates a circuit arrangement of AND gates 330 and 340 and OR gates 335 and 345 for implementing the above equations for the syndrome decoder 320. It will be noted that the logical combinations of the syndrome bit $S_1-S_6$ are illustrated only for $J_0$, $J_{21}$, $M_0$ and $M_{40}$ in FIG. 11, but it will be understood that the appropriate combinations for the remaining terms may readily be obtained from the previously provided syndrome bit table.

With regard to the duplicate logic 321 in FIG. 10, the above described operations thereof may for example be implemented in accordance with the following equation, wherein the "+" indicates a logical or:

$$d = (m+b)(M+B)$$

Figure 12:
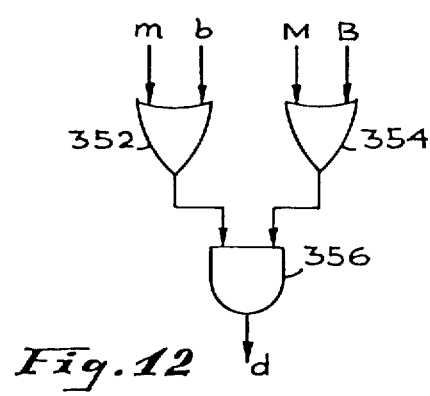

FIG. 12 illustrates an example of a circuit arrangement of OR gates 352 and 354 and AND gate 356 for implementing the above equation for d.

Finally, with regard to the load logic 322 in FIG. 10, it will be understood that the above described operations thereof may for example be implemented in accordance with the following equation:

$$L = mM' + bM'B'$$

Figure 13:
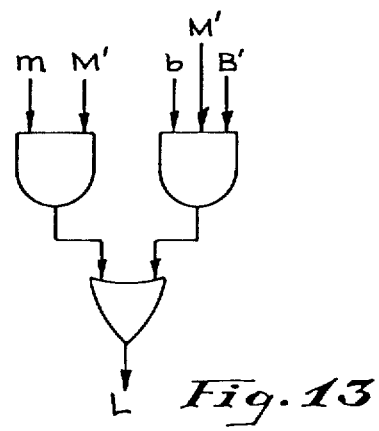

FIG. 13 illustrates an example of a circuit arrangement of AND gates 362 and 364 and OR gate 366 for implementing the above equation for L.

It is to be understood that the present invention is not to be considered as limited to the particular embodiments and examples described herein, since a wide variety of modifications and variations are possible within the scope of the invention. Accordingly, the present invention is to be considered as including all structures and methods coming within the scope of the appended claims.

What is claimed is:

1. In combination:
   means providing items of digital data, each having an associated check code chosen to permit the indication of a plurality of different types of data error conditions which may be present with respect to said items of data;
   signal pattern generation means to which said items of data and their associated error check codes are sequentially applied, said signal pattern generating means being responsive to said data items and associated check codes to generate one of a plurality of different data error signal patterns indicating which if any of said plurality of different types of data error conditions is present with respect to each item of data; and
   error log circuitry to which the data error signal patterns generated by said signal pattern generation means are applied;
   said error log circuitry including first means for decoding said signal patterns and in response to said decoding providing indications of the occurrence of at least two of said different types of error conditions which may be present with respect to a plurality of data items applied to said signal pattern generation means over a predetermined time period;
   said error log circuitry also including second means responsive to said signal patterns and to said indications of different types of data error conditions provided by said first means for establishing priorities between particular applied data error signal patterns and for indicating the highest priority data error signal pattern obtained for a plurality of data error signal patterns applied to said error log circuitry over said predetermined time period.

2. The invention in accordance with claim 1, wherein said first means of said error log circuitry includes a first register for storing said indications of different types of data error conditions produced over said predetermined time period, and wherein said second means of said error log circuitry includes a second register for storing the highest priority data error signal pattern applied over said predetermined time period.

3. The invention in accordance with claim 2, wherein said error log circuitry including means responsive to a signal occurring at the end of said predetermined time period for transmitting said indications of different types of data error conditions stored in said first register of said first means along with the highest priority data error signal pattern stored in said second register of said second means.

4. The invention in accordance with claim 3, including means for clearing said first and second registers after transmission of the contents thereof.

5. The invention in accordance with claim 1, 2, or 3, wherein said indications of different types of data error conditions which may be provided by said first means of said error log circuitry includes a means for providing a single digit error indication and a means for providing a multiple digit error indication.

6. The invention in accordance with claim 5, including means for signifying that said indications of different types of data error conditions which may be provided by said first means may indicate a plurality of the same type of data error conditions with respect to a plurality of data items applied to said signal pattern generation means over said predetermined time period.

7. The invention in accordance with claim 1, wherein said first means of said error log circuitry includes means capable of providing at least said two different types of indications simultaneously.

8. The invention in accordance with claim 1 or 2, wherein said second means of said error log circuitry includes logic circuitry for giving priority to a data error signal pattern corresponding to a first occurring error condition over that of a data error signal pattern corresponding to a later occurring error condition of the same type.

9. The invention in accordance with claim 8, wherein said logic circuitry of said second means gives priority to a data error signal pattern indicating a said multiple bit error over that of a said data error signal pattern indicating a single bit error.

10. The invention in accordance with claim 1, 2 or 3, wherein each data item is derived from a memory accompanied by an associated memory address, and wherein said second means of said error log circuitry also includes an indication of the memory address of said highest priority data error signal pattern.

* * * * *